US010970938B2

(12) United States Patent
Song et al.

(10) Patent No.: US 10,970,938 B2
(45) Date of Patent: Apr. 6, 2021

(54) METHOD AND APPARATUS FOR GENERATING 3D INFORMATION

(71) Applicant: Baidu Online Network Technology (Beijing) Co., Ltd, Beijing (CN)

(72) Inventors: Xibin Song, Beijing (CN); He Jiang, Beijing (CN); Ruigang Yang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/568,167

(22) Filed: Sep. 11, 2019

(65) Prior Publication Data

US 2020/0126315 A1    Apr. 23, 2020

(30) Foreign Application Priority Data

Oct. 23, 2018 (CN) .......................... 201811238007.1

(51) Int. Cl.
*G06T 19/20* (2011.01)
*G06T 7/73* (2017.01)
*G06T 15/08* (2011.01)

(52) U.S. Cl.
CPC ................ *G06T 19/20* (2013.01); *G06T 7/75* (2017.01); *G06T 15/08* (2013.01)

(58) Field of Classification Search
None
See application file for complete search history.

(56) References Cited

U.S. PATENT DOCUMENTS

| 2008/0253606 | A1* | 10/2008 | Fujimaki | G06T 7/85 |
| | | | | 382/100 |
| 2019/0034056 | A1* | 1/2019 | Eisenmann | G06F 3/04815 |
| 2019/0228564 | A1* | 7/2019 | Tan | G06K 9/00671 |

OTHER PUBLICATIONS

Xu Liang et al. "3D Pose Estimation of Video Vehicle Based on Fine Model," Computer Applications and Software, vol. 35, No. 7, Jul. 2018, pp. 205-210, School of Computer, Wuhan University, Wuhan 430072, Hubei, China.

* cited by examiner

*Primary Examiner* — Edward Martello
(74) *Attorney, Agent, or Firm* — Kilpatrick Townsend & Stockton LLP

(57) ABSTRACT

Embodiments of the present disclosure provide a method and apparatus for generating information. A method may include: selecting a three-dimensional object model from a preset three-dimensional object model set based on a to-be-matched object image in a target two-dimensional image; determining, based on a normal vector of a ground plane of the target two-dimensional image, a plane equation of ground corresponding to the normal vector of the ground plane in a three-dimensional space; adjusting a rotation parameter and a translation parameter of the three-dimensional object model in the plane characterized by the plane equation; and generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

15 Claims, 5 Drawing Sheets

METHOD AND APPARATUS FOR GENERATING 3D INFORMATION

CROSS-REFERENCE TO RELATED APPLICATIONS

This application claims priority to Chinese Patent Application No. 201811238007.1, filed on Oct. 23, 2018, titled "Method and apparatus for generating information," which is hereby incorporated by reference in its entirety.

TECHNICAL FIELD

Embodiments of the present disclosure relate to the field of computer technology, and in particular to, a method and apparatus for generating information.

BACKGROUND

A three-dimensional model is a polygonal identifier of an object, and is generally displayed using a computer or other video devices. The displayed object may be an entity in a real world, or an imaginary object. In general, things existing in a physical world and a natural world may all be expressed by the three-dimensional model. The three-dimensional model is generally generated by three-dimensional modeling tool software, or generated by other methods. As data of point and other information sets, the three-dimensional model may be generated manually, or generated based on a certain algorithm. A three-dimensional model matching contour of a two-dimensional object image may be determined, and then posture information of the two-dimensional object image may be obtained from posture information of the three-dimensional model.

SUMMARY

Embodiments of the present disclosure present a method and apparatus for generating information.

In a first aspect, an embodiment of the present disclosure provides a method for generating information, including: selecting a three-dimensional object model from a preset three-dimensional object model set based on a to-be-matched object image in a target two-dimensional image; determining, based on a normal vector of a ground plane of the target two-dimensional image, a plane equation of ground corresponding to the normal vector of the ground plane in a three-dimensional space; adjusting a rotation parameter and a translation parameter of the three-dimensional object model in a plane characterized by the plane equation; and generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

In some embodiments, the method further includes: adjusting, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

In some embodiments, the method further includes: re-selecting, in response to determining that the contour of the adjusted three-dimensional object model mismatches the contour of the to-be-matched object image in the target two-dimensional image, an unselected three-dimensional object model from the three-dimensional object model set, and adjusting a rotation parameter and a translation parameter of the re-selected three-dimensional object model based on the adjusted rotation parameter and the adjusted translation parameter of the three-dimensional object model.

In some embodiments, the normal vector of the ground plane is determined by: using, for ground images in preset two frames of ground images, pixel points having a gradient change of a pixel value of the ground images greater than a preset threshold as key points, and generating key point sets for the ground images; and selecting a preset number of pairs of corresponding key points from the generated two key point sets, and determining the normal vector of the ground plane based on the selected preset number of pairs of key points.

In some embodiments, the three-dimensional information includes posture information.

In a second aspect, an embodiment of the present disclosure provides an apparatus for generating information, including: a selecting unit configured to select a three-dimensional object model from a preset three-dimensional object model set based on a to-be-matched object image in a target two-dimensional image; a determining unit configured to determine, based on a normal vector of a ground plane of the target two-dimensional image, a plane equation of ground corresponding to the normal vector of the ground plane in a three-dimensional space; a first adjusting unit configured to adjust a rotation parameter and a translation parameter of the three-dimensional object model in a plane characterized by the plane equation; and a generating unit configured to generate, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

In some embodiments, the apparatus further includes: a second adjusting unit configured to adjust, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

In some embodiments, the apparatus further includes: a third adjusting unit configured to re-select, in response to determining that the contour of the adjusted three-dimensional object model mismatches the contour of the to-be-matched object image in the target two-dimensional image, an unselected three-dimensional object model from the three-dimensional object model set, and adjust a rotation parameter and a translation parameter of the re-selected three-dimensional object model based on the adjusted rotation parameter and the adjusted translation parameter of the three-dimensional object model.

In some embodiments, the normal vector of the ground plane is determined by: using, for ground images in preset two frames of ground images, pixel points having a gradient change of a pixel value of the ground images greater than a preset threshold as key points, and generating key point sets for the ground images; and selecting a preset number of pairs of corresponding key points from the generated two key point sets, and determining the normal vector of the ground plane based on the selected preset number of pairs of key points.

In some embodiments, the three-dimensional information includes posture information.

In a third aspect, an embodiment of the present disclosure provides an electronic device, including: one or more processors; and a storage apparatus configured to store one or more programs, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the computer program, when executed by a processor, implements the method according to any one implementation in the first aspect.

The method and apparatus for generating information provided by the embodiments of the present disclosure first select a three-dimensional object model from a preset three-dimensional object model set based on a to-be-matched object image in a target two-dimensional image; then determine, based on a normal vector of a ground plane of the target two-dimensional image, a plane equation of ground corresponding to the normal vector of the ground plane in a three-dimensional space; then adjust a rotation parameter and a translation parameter of the three-dimensional object model in a plane characterized by the plane equation; and finally generate, in response to determining that the contour of the adjusted three-dimensional object model matches the contour of the to-be-matched object image in the target two-dimensional image, three-dimensional information of an object corresponding to the to-be-matched object image based on the adjusted three-dimensional object model. The method and apparatus for generating information provided by the embodiments of the present disclosure match a three-dimensional object model with a to-be-matched two-dimensional object image, thereby achieving obtaining a rotation parameter and a translation parameter of a matched three-dimensional object model, and use the rotation parameter and the translation parameter of the obtained three-dimensional object model as three-dimensional information of the to-be-matched two-dimensional object image, thereby achieving obtaining the three-dimensional information of the to-be-matched two-dimensional object image.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
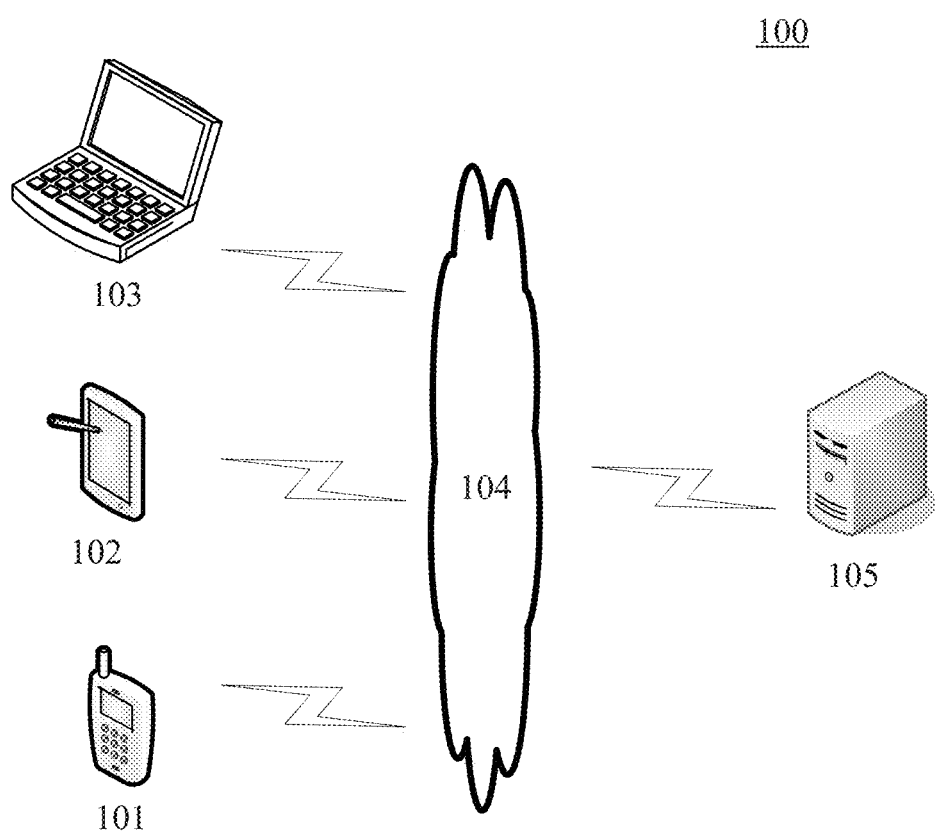
FIG. 1 is an architectural diagram of an exemplary system in which embodiments of the present disclosure may be implemented.

FIG. 1 shows an exemplary architecture 100 in which a method for generating information or an apparatus for generating information of embodiments of present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical fibers.

The terminal devices 101, 102, and 103 interact with the server 105 via the network 104, for example, to receive or send a message. The terminal devices 101, 102, and 103 may be provided with various applications, such as an information generation application, a web browser application, a shopping application, a search application, an instant messaging tool, an email client, social platform software, a text editing application, a browser application, and a reading application.

The terminal devices 101, 102, and 103 may be hardware or software. When the terminal devices 101, 102, and 103 are hardware, the terminal devices may be various electronic devices, including but not limited to a smart phone, a tablet computer, an ebook reader, a laptop portable computer, a desktop computer, or the like. When the terminal devices 101, 102, and 103 are software, the terminal devices may be installed in the above-listed electronic devices, or be implemented as a plurality of software programs or software modules (e.g., software programs or software modules for providing distributed services), or as a single software program or software module. This is not specifically limited here.

The server 105 may be a server providing various services, such as a server providing services for information generation applications on the terminal devices 101, 102, and 103. The information generation applications may include an image identification application, and a target tracking application. The server 105 may store various three-dimensional object models and two-dimensional images, for example, a three-dimensional vehicle model and a two-dimensional on-road vehicle image.

It should be noted that the method for generating information provided in embodiments of the present disclosure is generally executed by the terminal devices 101, 102, and 103. Accordingly, the apparatus for generating information is generally provided in the terminal devices 101, 102, and 103.

It should be further noted that the terminal devices 101, 102, and 103 may also store three-dimensional object models and two-dimensional images. In this case, the server 105 and the network 104 may not exist in the exemplary system architecture 100.

It should be understood that the numbers of terminal devices, networks, and servers in FIG. 1 are merely illustrative. Any number of terminal devices, networks, and servers may be provided based on actual requirements.

Figure 2:
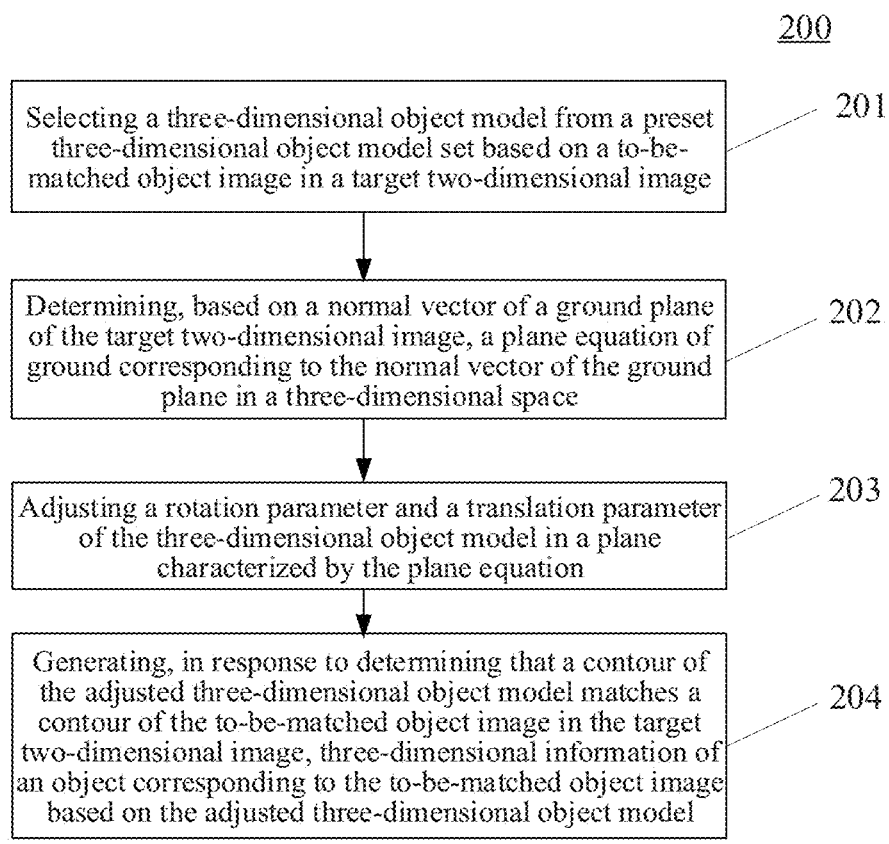
FIG. 2 is a flowchart of a method for generating information according to an embodiment of the present disclosure.

Further referring to FIG. 2, a process 200 of a method for generating information according to an embodiment of the present disclosure is shown. The method for generating information includes the following steps.

Step 201: selecting a three-dimensional object model from a preset three-dimensional object model set based on a to-be-matched object image in a target two-dimensional image.

In the present embodiment, an executing body (e.g., the terminal devices 101, 102, and 103 in FIG. 1) may calculate a matching degree between the three-dimensional object model and the to-be-matched object image, to determine a three-dimensional object model most approximate to the above-described to-be-matched object image in the three-dimensional object model set. Then, the executing body selects the above determined three-dimensional object model. The executing body may alternatively collect a result inputted by a user after comparing a similarity degree between the three-dimensional object model and the to-be-matched object image, to determine the selected three-dimensional object model.

In the present embodiment, the two-dimensional image may be a two-dimensional color image. Optionally, an object characterized by the to-be-matched object image in the target two-dimensional image may be a vehicle, or a roadside sign board, which is not limited herein. The three-dimensional object model may be a vehicle model, or other model designed based on actual requirements, which is not limited herein. The above target two-dimensional image may be a to-be-matched two-dimensional image selected from a specified two-dimensional image set.

Step 202: determining, based on a normal vector of a ground plane of the target two-dimensional image, a plane equation of ground corresponding to the normal vector of the ground plane in a three-dimensional space.

In the present embodiment, the normal vector of the ground plane of the target two-dimensional image refers to a normal vector of the ground plane displayed in the above target two-dimensional image in the three-dimensional space. Generally, the executing body may determine the plane equation of the ground plane based on the normal vector and coordinates of any one point in the ground plane. It should be noted that the method of determining, based on a point in a plane and a normal vector of the plane, the plane equation of the plane is a well-known technology widely studied and applied, and repeated description thereof will be omitted here.

Step 203: adjusting a rotation parameter and a translation parameter of the three-dimensional object model in a plane characterized by the plane equation.

In the present embodiment, the rotation parameter generally refers to a rotation angle of the three-dimensional object model with the normal vector of the ground plane as a rotation axis. The translation parameter generally refers to a translation parameter of the three-dimensional object model in the above plane along two axes. The two axes refer to coordinate axes, perpendicular to the normal vector of the ground plane, in a three-dimensional space of the above plane. Generally, the rotation parameter and the translation parameter may be adjusted by changing the rotation angle and a value of the translation parameter. The rotation parameter and the translation parameter are generally used to represent a posture of the three-dimensional object model.

Step 204: generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

In the present embodiment, the executing body may determine whether the contour of the three-dimensional object model matches the contour of the to-be-matched object image by determining whether a similarity between the contour of the three-dimensional object model and the contour of the to-be-matched object image meets a preset condition, or by collecting a result inputted by the user after comparing a similarity degree between the contour of the three-dimensional object model and the contour of the to-be-matched object image, which is not limited herein.

The three-dimensional information of the object generally refers to feature information of the object (e.g., a three-dimensional bounding box of the object). The three-dimensional information of the object may alternatively refer to posture information of the object corresponding to an object image and displayed in the image. The posture information may include: the rotation parameter and the translation parameter. The rotation parameter generally refers to a rotation angle of the object displayed in the image with the normal vector of the ground plane as a rotation axis. The translation parameter generally refers to a translation parameter of the object displayed in the image in the above plane along two axes. The two axes refer to the coordinate axes, perpendicular to the normal vector of the ground plane, in the three-dimensional space of the above plane. The rotation parameter and the translation parameter are generally used to characterize a posture of the object displayed in the image.

The method provided by the above embodiments of the present disclosure determines a plane of the ground based on the normal vector of the ground plane of the target two-dimensional image. The three-dimensional object model can be rotated and translated merely on the ground, thereby reducing a degree of freedom of motion of the three-dimensional object model in space. Specifically, the three-dimensional object model can be rotated merely around a normal vector of the ground plane, the number of rotational degrees of freedom changes from 3 to 1, the three-dimensional object model can be moved merely along the ground, and the number of translational degrees of freedom changes from 3 to 2. Therefore, the method provided by the above embodiments of the present disclosure greatly reduces the complexity of the user's operation, and improves the efficiency of matching the contour of the three-dimensional object model with contour of an object in the two-dimensional image.

Figure 3:
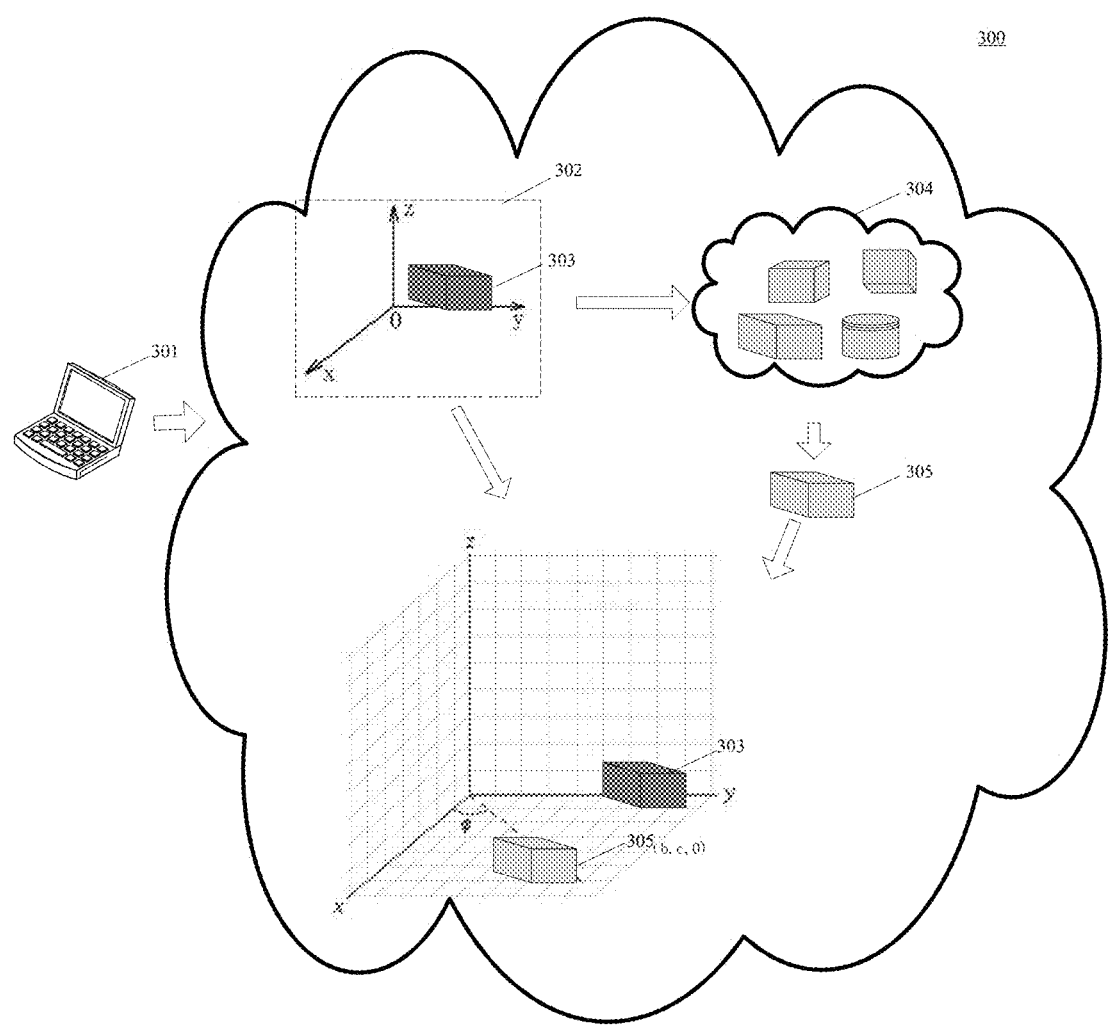
FIG. 3 is a schematic diagram of an application scenario of the method for generating information according to an embodiment of the present disclosure.

Further referring to FIG. 3, FIG. 3 is a schematic diagram of an application scenario 300 of the method for generating information according to the present embodiment. In the application scenario 300 of FIG. 3, a terminal device 301 may select a cuboid 305 from a preset three-dimensional object model set 304 based on a to-be-matched cuboid image 303 in a two-dimensional image 302; determine, based on a normal vector (a z axis of an x-y-z coordinate system) of a ground plane of the two-dimensional image, a plane equation (an x-y plane in the x-y-z coordinate system) of ground corresponding to the normal vector of the ground plane in a three-dimensional space; adjust a rotation parameter (a rotation angle φ of the z axis) and a translation parameter (an x coordinate and a y coordinate, e.g., (b, c)) of the cuboid 305 in a plane (the x-y plane in the x-y-z coordinate system) characterized by the plane equation; and generate, in response to determining that a contour of the adjusted cuboid 305 matches a contour of the to-be-matched cuboid image 303 in the target two-dimensional image 302, three-dimensional information (the rotation angle φ, the x coordinate b, and the y coordinate c) of a cuboid corresponding to the to-be-matched cuboid image 303 based on the adjusted cuboid 305.

The method provided by the above embodiments of the present disclosure determines a plane of the ground based on the normal vector of the ground plane of the target two-dimensional image. The three-dimensional object model can be rotated and translated merely on the ground, thereby reducing a degree of freedom of motion of the three-dimensional object model in space. Specifically, the three-dimensional object model can be rotated merely around a normal vector of the ground plane, the number of rotational degrees of freedom changes from 3 to 1, the three-dimensional object model can be moved merely along the ground, and the number of translational degrees of freedom changes from 3 to 2. Therefore, the method provided by the above embodiments of the present disclosure greatly reduces the complexity of the user's operation, and may improve the efficiency of matching the contour of the three-dimensional object model with contour of an object in the two-dimensional image.

Figure 4:
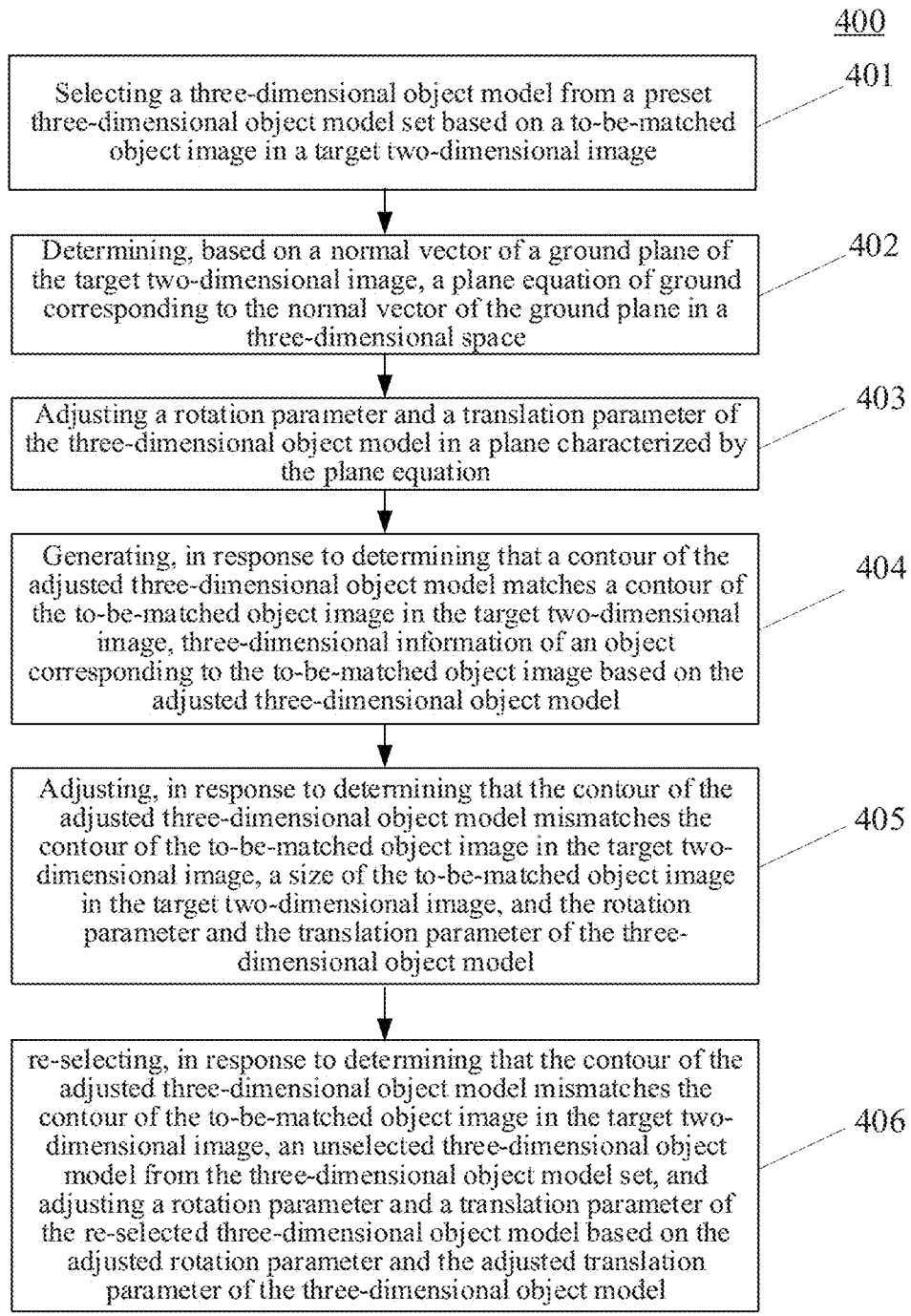
FIG. 4 is a flowchart of the method for generating information according to another embodiment of the present disclosure.

Further referring to FIG. 4, a process 400 of another embodiment of the method for generating information is shown. The process 400 of the method for generating information includes the following steps.

Step 401: selecting a three-dimensional object model from a preset three-dimensional object model set based on a to-be-matched object image in a target two-dimensional image.

Step 402: determining, based on a normal vector of a ground plane of the target two-dimensional image, a plane equation of ground corresponding to the normal vector of the ground plane in a three-dimensional space.

Step 403: adjusting a rotation parameter and a translation parameter of the three-dimensional object model in a plane characterized by the plane equation.

Step 404: generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

Specific operations in steps 401-404 in the present embodiment are basically identical to the operations in steps 201-204 in the embodiment shown in FIG. 2, and the description of which will not be repeated here.

The normal vector of the ground plane of the target two-dimensional image refers to a normal vector of the ground plane displayed in the above target two-dimensional image in the three-dimensional space. Generally, the plane equation of the ground plane may be determined based on the normal vector and coordinates of any one point in the ground plane. The method of determining the plane equation is a well-known technology widely studied and applied, and the description thereof will not be repeated here. As an example, the coordinates of any one point in the ground plane may be obtained based on a photographing position of the target two-dimensional image. Specifically, the coordinates of any one point in the ground plane may be obtained based on a height of the photographing position. For example, in a road scenario, the photographing position is generally arranged on a top of a vehicle, and the height of the photographing position may be obtained based on a height of the top of the vehicle. As another example, a direction of the determined normal vector of the ground plane may be used as a coordinate axis of a three-dimensional coordinate space, and a plane of the other two coordinate axes perpendicular to the normal vector of the ground plane is used as the ground. Then, ground orientation may be determined based on the photographing position.

In some alternative implementations of the present embodiment, the normal vector of the ground plane of the target two-dimensional image may be determined by: using, for ground images in preset two frames of ground images, pixel points having a gradient change of a pixel value of the ground images greater than a preset threshold as key points, and generating key point sets for the ground images; and selecting a preset number of pairs of corresponding key points from the generated two key point sets, and determining the normal vector of the ground plane based on the selected preset number of pairs of key points.

The preset two frames of ground images generally refer to two images photographed from different angles of given ground. The preset threshold may be set based on actual requirements. The preset number of pairs may be set based on actual requirements (e.g., 4 pairs). Each pair of key points among the preset number of pairs is obtained by selecting one key point from each of the two key point sets. Each pair of key points refers to pixel points of a given position in the given ground in two images.

In some alternative implementations of the present embodiment, the three-dimensional information may include at least one of the following items: the rotation parameter or the translation parameter.

Step 405: adjusting, in response to determining that the contour of the adjusted three-dimensional object model mismatching the contour of the to-be-matched object image in the target two-dimensional image, a size of the to-be-matched object image in the target two-dimensional image, and the rotation parameter and the translation parameter of the three-dimensional object model.

In the present embodiment, the adjusting a size of the object image generally refers to zooming in or zooming out the object image. Specific operations of the adjusting the rotation parameter and the translation parameter of the three-dimensional object model are basically identical to the operations in step 203 in the embodiment shown in FIG. 2, and the description thereof will not be repeated here.

In the present embodiment, after performing the above adjusting operations, whether the contour of the adjusted three-dimensional object model matches the contour of the to-be-matched object image in the target two-dimensional image is further determined.

Step 406: re-selecting, in response to determining that the contour of the adjusted three-dimensional object model mismatches the contour of the to-be-matched object image in the target two-dimensional image, an unselected three-dimensional object model from the three-dimensional object model set, and adjusting a rotation parameter and a translation parameter of the re-selected three-dimensional object model based on the adjusted rotation parameter and the adjusted translation parameter of the three-dimensional object model.

Specific operations of the adjusting the rotation parameter and the translation parameter of the three-dimensional object model in the present embodiment are basically identical to the operations in step 203 in the embodiment shown in FIG. 2, and the description thereof will not be repeated here.

As can be seen from FIG. 4, compared with the corresponding embodiment of FIG. 2, the process 400 of the method for generating information in the present embodiment emphasizes steps 405-406. Thus, the scheme described in the present embodiment may, after determining the three-dimensional object model mismatching the object image, further adjust the size of the object image and a posture of the three-dimensional object model, and then further perform contour matching. If the contour of the adjusted three-dimensional object model still mismatches the contour of the to-be-matched object image in the target two-dimensional image, then the three-dimensional object model is replaced to further perform the contour matching based on the rotation parameter and the translation parameter. Thus, diversified and efficient contour matching is achieved, and the three-dimensional information of the object is obtained based on the matching result.

Figure 5:
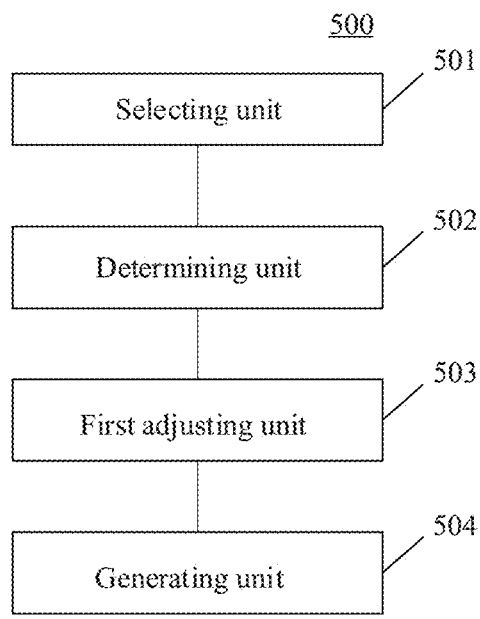
FIG. 5 is a schematic structural diagram of an apparatus for generating information according to an embodiment of the present disclosure.

Further referring to FIG. 5, as an implementation of the method shown in the above figures, the present disclosure provides an embodiment of an apparatus for generating information. The embodiment of the apparatus corresponds to the embodiment of the method shown in FIG. 2. The apparatus may be specifically applied to various electronic devices.

As shown in FIG. 5, the apparatus 500 for generating information provided by the present embodiment includes: a selecting unit 501, a determining unit 502, a first adjusting unit 503, and a generating unit 504. The selecting unit 501 is configured to select a three-dimensional object model from a preset three-dimensional object model set based on a to-be-matched object image in a target two-dimensional image; the determining unit 502 is configured to determine, based on a normal vector of a ground plane of the target two-dimensional image, a plane equation of ground corresponding to the normal vector of the ground plane in a three-dimensional space; the first adjusting unit 503 is configured to adjust a rotation parameter and a translation parameter of the three-dimensional object model in a plane characterized by the plane equation; and the generating unit 504 is configured to generate, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

In the present embodiment, specific processing of the selecting unit 501, the determining unit 502, the first adjusting unit 503, and the generating unit 504 in the apparatus 500 for generating information and the technical effects thereof may refer to the related description of step 201, step 202, step 203, and step 204 in the corresponding embodiment of FIG. 2, respectively, and the description thereof will not be repeated here.

In some alternative implementations of the present embodiment, the apparatus 500 for generating information further includes: a second adjusting unit (not shown in the figure) configured to adjust, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

In some alternative implementations of the present embodiment, the apparatus 500 for generating information further includes: a third adjusting unit (not shown in the figure) configured to re-select, in response to determining that the contour of the adjusted three-dimensional object model mismatches the contour of the to-be-matched object image in the target two-dimensional image, an unselected three-dimensional object model from the three-dimensional object model set, and adjust a rotation parameter and a translation parameter of the re-selected three-dimensional object model based on the adjusted rotation parameter and the adjusted translation parameter of the three-dimensional object model.

In some alternative implementations of the present embodiment, the normal vector of the ground plane is determined by: using, for ground images in preset two frames of ground images, pixel points having a gradient change of a pixel value of the ground images greater than a preset threshold as key points, and generating key point sets for the ground images; and selecting a preset number of pairs of corresponding key points from the generated two key point sets, and determining the normal vector of the ground plane based on the selected preset number of pairs of key points.

The apparatus provided by the above embodiment of the present disclosure selects the three-dimensional object model from the preset three-dimensional object model set through the selecting unit 501, determines, based on a normal vector of a ground plane of the target two-dimensional image, a plane equation of ground corresponding to the normal vector of the ground plane in a three-dimensional space through the determining unit 502, adjusts a rotation parameter and a translation parameter of the three-dimensional object model in a plane characterized by the plane equation through the adjusting unit 503, and then generates, in response to determining that the contour of the adjusted three-dimensional object model matches the contour of the to-be-matched object image in the target two-dimensional image, three-dimensional information of an object corresponding to the to-be-matched object image through the generating unit 504 based on the adjusted three-dimensional object model, thereby achieving generating the three-dimensional information of the object image in the two-dimensional image.

Figure 6:
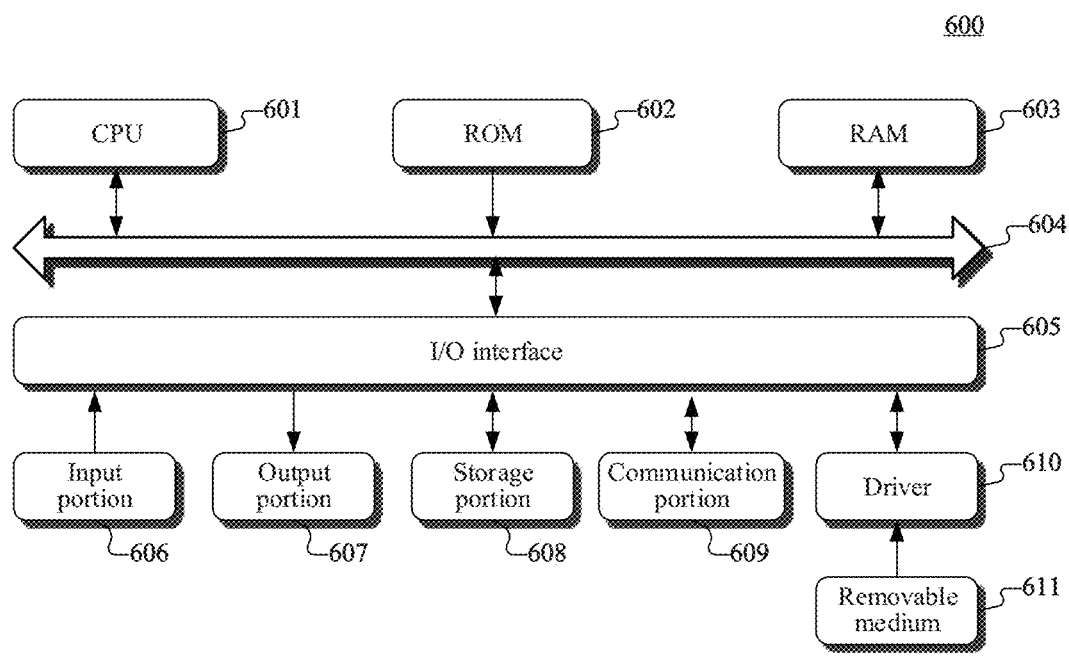
FIG. 6 is a schematic structural diagram of a computer system adapted to implement a server of embodiments of the present disclosure.

Referring to FIG. 6, a schematic structural diagram of a computer system 600 adapted to implement a server of embodiments of the present disclosure is shown. The server shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, such that a computer program read therefrom is installed on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above functionalities defined by the method of the present disclosure.

It should be noted that the computer readable medium of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory device, or any suitable combination of the above. In the present disclosure, the computer readable storage medium may be any tangible medium containing or storing programs, which may be used by, or used in combination with, a command execution system, apparatus or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or may be connected to an external computer (for example, connected through the Internet using an Internet service provider).

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functionalities denoted by the blocks may occur in a sequence different from the sequences shown in the figures. For example, any two blocks presented in succession may be executed substantially in parallel, or they may sometimes be executed in a reverse sequence, depending on the functionalities involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including a selecting unit, a determining unit, a first adjusting unit, and a generating unit. The names of the units do not constitute a limitation to such units themselves in some cases. For example, the first adjusting unit may also be described as "a unit configured to adjust a rotation parameter and a translation parameter of the three-dimensional object model in a plane characterized by the plane equation."

In another aspect, the present disclosure further provides a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: select a three-dimensional object model from a preset three-dimensional object model set based on a to-be-matched object image in a target two-dimensional image; determine, based on a normal vector of a ground plane of the target two-dimensional image, a plane equation of ground corresponding to the normal vector of the ground plane in a three-dimensional space; adjust a rotation parameter and a translation parameter of the three-dimensional object model in the plane characterized by the plane equation; and generate, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for generating information, comprising:
selecting a three-dimensional object model from a preset three-dimensional object model set based on a to-be-matched object image in a target two-dimensional image;
determining, based on a normal vector of a ground plane of the target two-dimensional image, a plane equation of ground corresponding to the normal vector of the ground plane in a three-dimensional space;
adjusting a rotation parameter and a translation parameter of the three-dimensional object model in a plane characterized by the plane equation; and
generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

2. The method according to claim 1, wherein the method further comprises:
adjusting, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

3. The method according to claim 1, wherein the method further comprises:
re-selecting, in response to determining that the contour of the adjusted three-dimensional object model mismatches the contour of the to-be-matched object image in the target two-dimensional image, an unselected three-dimensional object model from the three-dimensional object model set; and
adjusting a rotation parameter and a translation parameter of the re-selected three-dimensional object model based on the adjusted rotation parameter and the adjusted translation parameter of the three-dimensional object model.

4. The method according to claim 1, wherein the normal vector of the ground plane is determined by:
for ground images in preset two frames of ground images:
using pixel points having a gradient change of a pixel value of the ground images greater than a preset threshold as key points; and
generating key point sets for the ground images;
selecting a preset number of pairs of corresponding key points from the generated two key point sets; and
determining the normal vector of the ground plane based on the selected preset number of pairs of key points.

5. The method according to claim 1, wherein the three-dimensional information comprises posture information.

6. An apparatus for generating information, comprising:
at least one processor; and
a memory storing instructions, wherein the instructions when executed by the at least one processor, cause the at least one processor to perform operations, the operations comprising:
selecting a three-dimensional object model from a preset three-dimensional object model set based on a to-be-matched object image in a target two-dimensional image;
determining, based on a normal vector of a ground plane of the target two-dimensional image, a plane equation of ground corresponding to the normal vector of the ground plane in a three-dimensional space;
adjusting a rotation parameter and a translation parameter of the three-dimensional object model in a plane characterized by the plane equation; and
generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

7. The apparatus according to claim 6, wherein the operations further comprise:
adjusting, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

8. The apparatus according to claim 6, wherein the operations further comprise:
re-selecting, in response to determining that the contour of the adjusted three-dimensional object model mismatches the contour of the to-be-matched object image in the target two-dimensional image, an unselected three-dimensional object model from the three-dimensional object model set; and
adjusting a rotation parameter and a translation parameter of the re-selected three-dimensional object model based on the adjusted rotation parameter and the adjusted translation parameter of the three-dimensional object model.

9. The apparatus according to claim 6, wherein the normal vector of the ground plane is determined by:
for ground images in preset two frames of ground images:
using pixel points having a gradient change of a pixel value of the ground images greater than a preset threshold as key points; and
generating key point sets for the ground images;
selecting a preset number of pairs of corresponding key points from the generated two key point sets; and
determining the normal vector of the ground plane based on the selected preset number of pairs of key points.

10. The apparatus according to claim 6, wherein the three-dimensional information comprises posture information.

11. A non-transitory computer readable medium, storing a computer program thereon, wherein the computer program, when executed by a processor, causes the processor to perform operations, the operations comprising:
selecting a three-dimensional object model from a preset three-dimensional object model set based on a to-be-matched object image in a target two-dimensional image;
determining, based on a normal vector of a ground plane of the target two-dimensional image, a plane equation of ground corresponding to the normal vector of the ground plane in a three-dimensional space;
adjusting a rotation parameter and a translation parameter of the three-dimensional object model in a plane characterized by the plane equation; and
generating, in response to determining that a contour of the adjusted three-dimensional object model matches a contour of the to-be-matched object image in the target two-dimensional image, three-dimensional information of an object corresponding to the to-be-matched object image based on the adjusted three-dimensional object model.

12. The non-transitory computer readable medium according to claim 11, wherein the operations further comprise:
adjusting, in response to determining that the contour of the adjusted three-dimensional object model mismatches the contour of the to-be-matched object image in the target two-dimensional image, a size of the to-be-matched object image in the target two-dimensional image, and the rotation parameter and the translation parameter of the three-dimensional object model.

13. The non-transitory computer readable medium according to claim 11, wherein the operations further comprise:
re-selecting, in response to determining that the contour of the adjusted three-dimensional object model mismatches the contour of the to-be-matched object image in the target two-dimensional image, an unselected three-dimensional object model from the three-dimensional object model set; and
adjusting a rotation parameter and a translation parameter of the re-selected three-dimensional object model based on the adjusted rotation parameter and the adjusted translation parameter of the three-dimensional object model.

14. The non-transitory computer readable medium according to claim 11, wherein the normal vector of the ground plane is determined by:
for ground images in preset two frames of ground images:
using pixel points having a gradient change of a pixel value of the ground images greater than a preset threshold as key points; and
generating key point sets for the ground images;
selecting a preset number of pairs of corresponding key points from the generated two key point sets; and
determining the normal vector of the ground plane based on the selected preset number of pairs of key points.

15. The non-transitory computer readable medium according to claim 11, wherein the three-dimensional information comprises posture information.

* * * * *